United States Patent
Lutz et al.

(10) Patent No.: US 12,243,211 B2
(45) Date of Patent: Mar. 4, 2025

(54) METHOD TO TRAIN A NEURAL NETWORK TO DETECT A TOOL STATUS FROM IMAGES, METHOD OF MACHINING AND/OR MANUFACTURING, AND INSTALLATION

(71) Applicants: Benjamin Samuel Lutz, Munich (DE); Daniel Regulin, Munich (DE)

(72) Inventors: Benjamin Samuel Lutz, Munich (DE); Daniel Regulin, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 469 days.

(21) Appl. No.: 17/460,155

(22) Filed: Aug. 27, 2021

(65) Prior Publication Data
US 2022/0067913 A1    Mar. 3, 2022

(30) Foreign Application Priority Data

Aug. 28, 2020    (EP) ..................... 20193430

(51) Int. Cl.
*G06T 7/00*     (2017.01)
*G05B 19/4065*     (2006.01)
*G06N 3/08*     (2023.01)

(52) U.S. Cl.
CPC ........ *G06T 7/0004* (2013.01); *G05B 19/4065* (2013.01); *G06N 3/08* (2013.01);
(Continued)

(58) Field of Classification Search
CPC ......... G06T 7/0004; G06T 2207/10056; G06T 2207/20081; G06T 2207/20084;
(Continued)

(56) References Cited

U.S. PATENT DOCUMENTS

| 8,781,982 B1* | 7/2014 | Das ................. G06N 3/084 706/21 |
| 2006/0067573 A1* | 3/2006 | Parr ................. G06F 18/00 382/154 |

(Continued)

FOREIGN PATENT DOCUMENTS

| CA | 3002198 A | 11/2018 |
| EP | 3399466 A1 | 11/2018 |
| GB | 2578771 A | 5/2020 |
| JP | H11267649 A | 10/1999 |
| JP | H11267949 A | 10/1999 |

OTHER PUBLICATIONS

European Search Report for European Application No. 20193430.4-1216 dated Feb. 18, 2021.
(Continued)

*Primary Examiner* — David F Dunphy
(74) *Attorney, Agent, or Firm* — Lempia Summerfield Katz LLC

(57) ABSTRACT

In a method for training a neural network to recognize a tool condition based on image data, the neural network is trained to recognize the tool condition of a first tool type, and image data of a second tool type is applied. The image data is subjected to image processing. Via this, the image data of the second tool type is converted into image data of the first tool type. The neural network is trained based on the converted image data. In a method for machining and/or production via the first tool type, the tool condition of the first tool type is recognized via a neural network that is trained in accordance with such a method.

12 Claims, 2 Drawing Sheets

(52) U.S. Cl.
CPC ............... *G06T 2207/10056* (2013.01); *G06T 2207/20081* (2013.01)

(58) Field of Classification Search
CPC .... G05B 19/4065; G05B 13/027; G06N 3/08; G06N 3/04; G06F 18/214; G06F 18/241
See application file for complete search history.

(56) References Cited

U.S. PATENT DOCUMENTS

| | | | |
|---|---|---|---|
| 2017/0344860 A1* | 11/2017 | Sachs | G06V 40/169 |
| 2018/0073303 A1* | 3/2018 | Bilen | C22F 1/006 |
| 2019/0147320 A1* | 5/2019 | Mattyus | G06V 20/182 |
| | | | 382/155 |
| 2021/0183027 A1* | 6/2021 | Duan | G06V 10/774 |
| 2023/0129992 A1* | 4/2023 | Inagaki | G06T 7/0002 |
| | | | 483/8 |
| 2023/0360192 A1* | 11/2023 | Lutz | G06T 7/001 |

OTHER PUBLICATIONS

"Research on Techniques of cutting tool wear condition monitoring Based on Geometrical Shape and Texture Analysis of Tool Wear Images" Feb. 2, 2012, pp. 1-79, with English abstract.
D'Addona, Doriana M., Amm Sharif Ullah, and Davide Matarazzo. "Tool-wear prediction and pattern-recognition using artificial neural network and DNA-based computing." Journal of Intelligent Manufacturing 28 (2017): 1285-1301.

\* cited by examiner

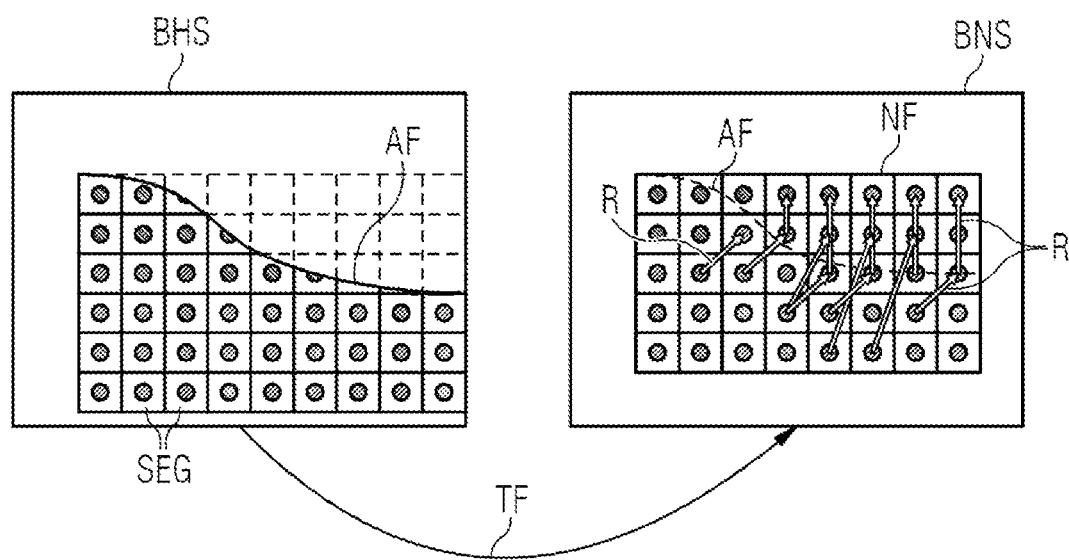

METHOD TO TRAIN A NEURAL NETWORK TO DETECT A TOOL STATUS FROM IMAGES, METHOD OF MACHINING AND/OR MANUFACTURING, AND INSTALLATION

This application claims the benefit of European Patent Application Number EP 20193430.4, filed on Aug. 28, 2020, which is hereby incorporated by reference in its entirety.

BACKGROUND

The present embodiments relate to a method for training a neural network to recognize a tool condition based on image data, a machining and/or production method, and to an installation.

In machining production, the tool that is used and the wear thereof are highly relevant: The wear of tools is a central cost factor in machining production; and it is possible to obtain important information about the machining process itself by analyzing the occurrence of wear in the tool. It is thus possible to derive machining parameters from the occurrence of wear in the tool in order to machine the workpiece more precisely or with less tool wear. To this end, the wear of the tool is to be accurately acquired.

In order to acquire a degree of wear of the tool, optical methods that are able to differentiate between various categories of wear (e.g., between flank wear or a built-up edge or formation of notches) are known. As is known, it is possible not only to identify the presence of a wear-induced defect of tools, but rather it is additionally possible to determine further information, such as, for example, a width and a shape and a surface area, of the respective defect.

It is additionally known to use artificial intelligence methods to recognize categories of wear.

However, in artificial intelligence methods, a neural network is to be specifically trained to recognize defects.

Such methods have therefore not until now been able to be used for new tool types, since generally no training data at all exists in this regard, and training on new tool types thus need a high manual outlay and high entry barriers to the use of new tool types.

This situation is particularly relevant for application in industry, since there is a particularly wide variety of tool types for machining production here. Tools (e.g., cutting tools) differ both in terms of geometry and in terms of coatings used. Specifically in this case, neural networks are to be adapted, and this is often complex and expensive due to the training of neural networks.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved method for training a neural network to recognize a tool condition is provided. As other examples, an improved method and an improved installation for machining and/or producing a tool are provided.

In a method according to an embodiment for training a neural network to recognize a tool condition based on image data, the neural network is trained to recognize the tool condition of a first tool type, and image data of a second tool type is applied, these being subjected to image processing. The image data of the second tool type is converted into image data of the first tool type by the image processing. In the method according to the present embodiments, the neural network is trained based on the converted image data.

In one embodiment, by virtue of the method according to the present embodiments, image data of the second tool type is able to be applied and be converted into image data of the first tool type. It is thereby possible to compute image data thus tailored to the first tool type. It is thus possible to dispense with manually obtaining image data of the first tool type. The expenditure that is otherwise required to generate image data of the first tool type is thus reduced, according to the present embodiments, to a mere conversion of the image data of the second tool type into image data of the first tool type. Based on the converted image data, the neural network is thereby able to be trained in the same way as using actually acquired image data of the first tool type.

In known solutions, actually acquired image data of the first tool type, for example, had to be classified initially by experts in the field in order to be able to assign a tool condition, such as, for example, tool wear, to the actually acquired image data. Manual assessments therefore are to be made in the case of the actually acquired image data. In the method according to the present embodiments, these dedicated assessments are eschewed. Instead, the conversion of the image data of the second tool type into those of the first tool type may takes place in an automated manner (e.g., by way of image processing software).

The first tool type and the second tool type within the present embodiments may differ from one another.

In the method according to the present embodiments, the image data may be converted such that the shape of the second tool type is converted into a shape of the first tool type.

For example, tool types often differ specifically in terms of shape (e.g., in the case of subtractive machining tools). Cutting edges and/or millers and/or drills, for example, often differ in terms of shape.

In one embodiment, in the method according to the present embodiments, the shape of the second tool type in the image data is converted into a shape of the first tool type such that the image data of the second tool type is split into small image regions that are modified in terms of relative orientation and/or position and/or size within the image data of the second tool type. The modified image data may thus reproduce the shape of the first tool type.

As an alternative or in addition, in the method, the image data is converted such that the color of the second tool type is converted into a color of the first tool type.

Tool types typically often differ in terms of tool material and/or coating (e.g., on a region of the tool type that serves for machining purposes). This different coating and/or the different material of the second tool type and the first tool type may be simulated realistically by adapting the color of the tool type. Image data of the second tool type are therefore able to be efficiently converted into those of the first tool type by adapting the color of the second tool type.

In one embodiment, in the method, the first tool type and/or the second tool type is configured for the subtractive machining of a workpiece.

Specifically in the case of tool types that are configured for subtractive machining, a tool condition is a variable that is particularly relevant to costs. For example, both a timely exchange of tools and a service life that is as long as possible have a significant effect on the machining costs of the workpiece. An accurate assessment of the tool condition of the tool type used is therefore highly important for economic efficiency in machining and/or production.

In the method according to the present embodiments, the first tool type and/or the second tool type may form a cutting tool and/or milling tool and/or a drilling tool. In one embodiment, the first tool type and/or the second tool type is or includes a cutting edge and/or a miller and/or a drill.

In the method according to the present embodiments, the image data may arise from optical imaging. In the method according to the present embodiments, the image data is appropriately obtained using a camera (e.g., a microscope camera). In one embodiment, the image data is obtained digitally, such that the image data is able to be converted digitally (e.g., using software).

In the method according to the present embodiments, the tool condition may be a wear condition. Specifically wear conditions of tools have a high influence on the costs of machining the workpiece in subtractive machining. For example, an excessively early exchange of tools in machining leads to high tool costs. An excessively late exchange of tools may complicate the machining of workpieces and increase machining waste and costs induced thereby. As a result, using the method according to the present embodiments to assess wear conditions increases cost efficiency in machining and/or production.

In the method according to the present embodiments, the image data may be converted by modifying color channels and/or compressing and/or stretching image data and/or splitting image data and putting the image data back together differently (e.g., with a different position and/or size and/or orientation).

The machining and/or production method according to the present embodiments is performed by way of the first tool type, where the tool condition of the first tool type is recognized by way of a neural network that is trained in accordance with a method as described above.

The machining and/or production method according to the present embodiments may be performed by way of the first tool type, where the neural network is trained by way of the method according to the present embodiments. In other words, the training of the neural network may form part of the machining and/or production method according to the present embodiments.

The machining and/or production may be adapted and/or interrupted depending on the tool condition.

The installation according to the present embodiments for machining and/or production by way of a first tool type includes a neural network that is trained in accordance with a method according to the present embodiments for training a neural network as explained in the above description. Alternatively or additionally, the installation is configured to carry out a machining and/or production method according to the present embodiments as described above. The installation may have a machining device for the first tool type that may be controlled depending on the wear condition, and/or the installation is configured to interrupt production and/or machining using the machining device so that the first tool type is able to be changed. The installation may have a training device (e.g., including one or more processors) for training the neural network by way of the method according to the present embodiments as described above. The installation may include an image processing device and/or image processing software that is configured to convert the image data of the second tool type into image data of the first tool type.

The installation according to the present embodiments may include an image acquisition unit for acquiring an image of the first tool type and an evaluation unit (e.g., including one or more processors) having the neural network. The evaluation unit is configured to recognize a degree of wear of the first tool type. The image acquisition unit may be a camera (e.g., a microscope camera).

BRIEF DESCRIPTION OF THE DRAWINGS

FIG. 3 shows a schematic basic diagram of a transformation of image data of a second cutting edge type into image data of a first cutting edge type in the embodiment of the method according to FIG. 2.

DETAILED DESCRIPTION

Figure 1:
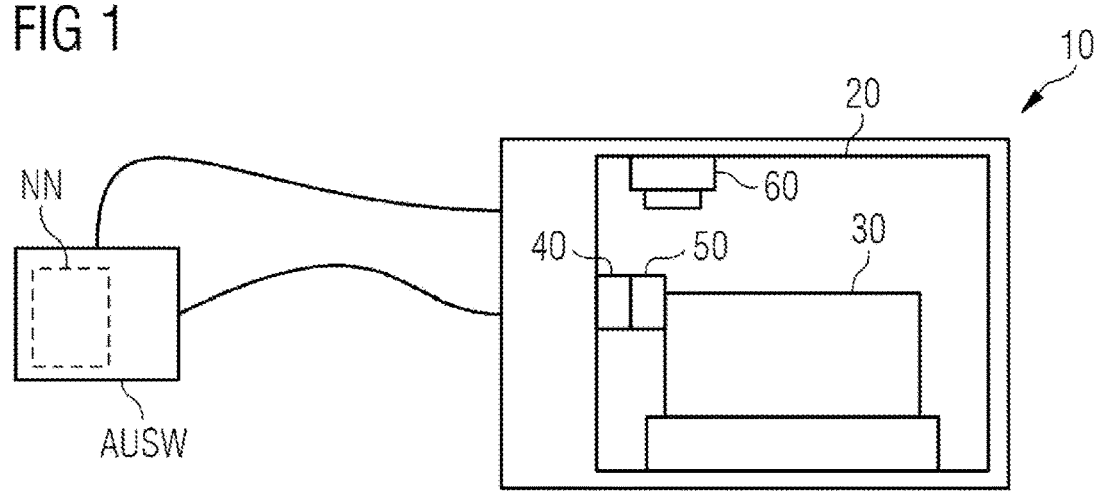
FIG. 1 shows a schematic basic sketch of an installation for performing a method according to an embodiment for machining a workpiece.

An installation 10 according to an embodiment, illustrated in FIG. 1, has a process chamber 20 in which a workpiece 30 is machined in accordance with a method BEAR according to an embodiment for machining a workpiece 30. The workpiece 30 is machined by being milled via a milling tool 40. The milling tool 40 has a cutting edge 50 that wears when milling the workpiece 30.

The process chamber 20 of the installation 10 also contains a camera 60 that records an image BNS of the cutting edge 50 of the milling tool 40 between machining phases and evaluates the image using an evaluation device AUSW. The camera 60 in the illustrated exemplary embodiment is a microscope camera that acquires a high-resolution image BNS of the cutting edge 50 in an image acquisition act BEE. In this case, the camera 60 primarily acquires a region of the cutting edge 50 that is typically subject to wear. In the exemplary embodiment shown, this is a main flank surface and a rake surface of the cutting edge 50.

Based on the images BNS of the cutting edge 50, the evaluation device AUSW first determines whether the cutting edge 50 is still able to be used or possibly has to be exchanged. Based on the images BNS, the evaluation device AUSW also determines whether and what adaptation of machining parameters of the installation 20 are to be provided if the tool 30 is to continue to be machined by the cutting edge 50.

In order to evaluate the images BNS of the cutting edge 50, the evaluation device AUSW includes a neural network NN that, in a first act, is trained based on image data to identify a tool condition using the method NMG according to one or more of the present embodiments for training a neural network.

Figure 2:
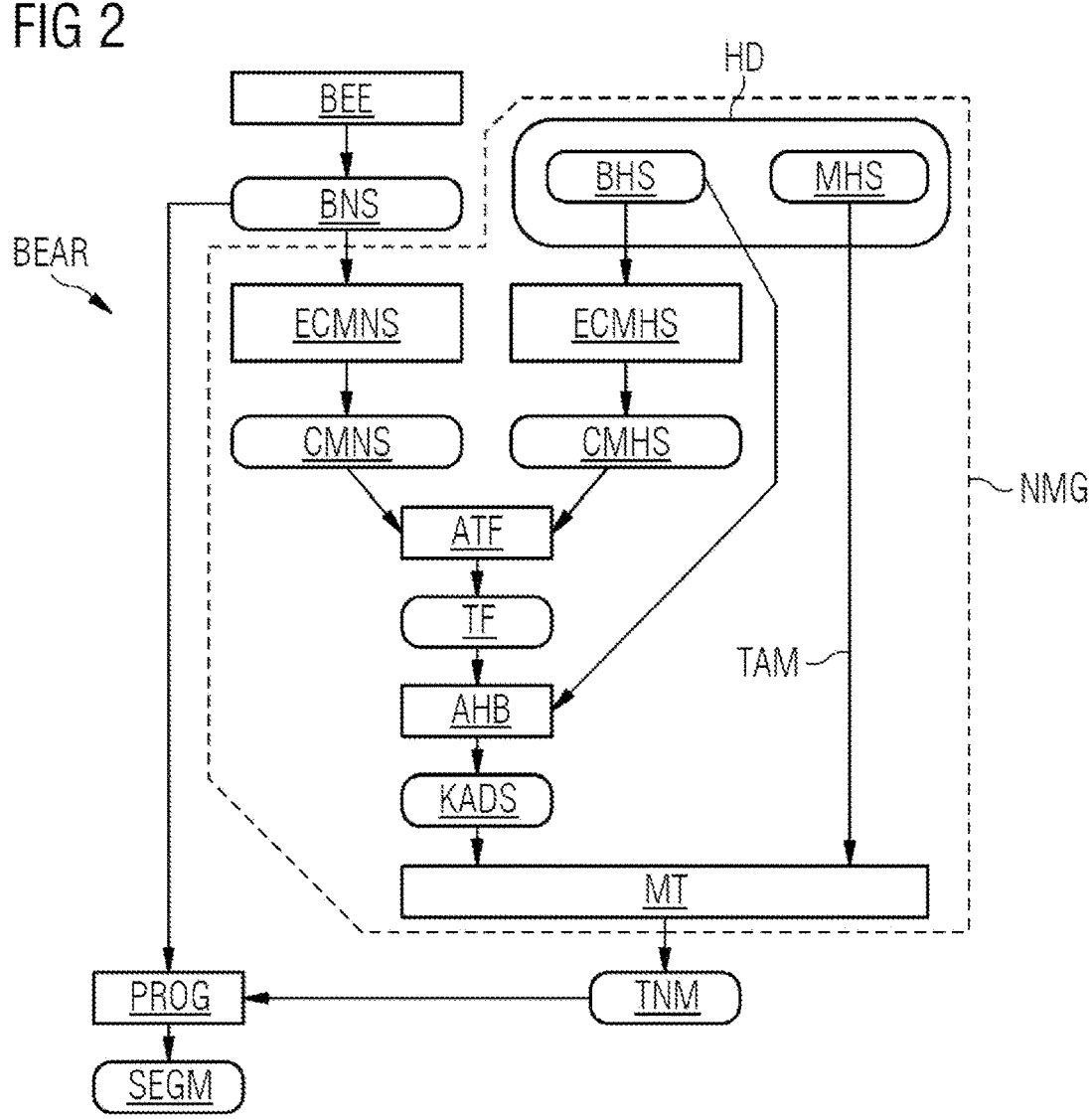
FIG. 2 shows a schematic flowchart of one exemplary embodiment of a method for machining a workpiece via the installation according to FIG. 1.

The training of the neural network NN takes place, according to the present embodiments, as shown in FIG. 2. In the method shown in FIG. 2, the cutting edge 50 belongs to a first cutting edge type that has not yet until now been used to train the neural network NN of the evaluation device AUSW. However, images BHS of historical cutting edges (e.g., images BHS of a second cutting edge type) do exist, these already having been classified into various degrees of wear MHS by process experts.

In order to automatically train the neural network NN on the first cutting edge type, multiple images BNS of various cutting edges 50 of the first cutting edge type with various wear conditions are to be acquired. Such wear conditions may, for example, be assigned to categories such as "new condition", "machined condition", and "worn condition". In the illustrated exemplary embodiment, the images BNS cover all categories that come into consideration. The images BNS of the new cutting edge 50 are buffer-stored in order to train the neural network NN.

However, instead of recording actual images BNS of cutting edges 50 of the first cutting edge type for various wear conditions, in the method according to the present embodiments, manipulated image data BNS is used to train the neural network NN.

To this end, historical data HD regarding cutting edges of the second cutting edge type are used, these having already been acquired in the past and being kept in a memory of the evaluation device AUSW. This historical data HD consists of a tuple of a historical image BHS of the cutting edge of the second cutting edge type and an associated category MHS of the wear condition, these corresponding to the above-described categories of the wear condition. These categories MHS of the wear condition are categories MHS that are recognized by process experts based on the image BHS of the cutting edges of the second cutting edge type.

In the evaluation device AUSW, characteristic features CMNS of cutting edges 50 of the first cutting edge type are then initially acquired in a first characterization act ECMNS (e.g., by evaluating the images BNS by way of software, such as software implemented using the Python programming language). This software analyzes the set of images BNS of the cutting edge 50 of the first cutting edge type and calculates the characteristic features CMNS of the cutting edge 50 (e.g., a shape and a color of the cutting edge 50). These characteristic features CMNS of the cutting edges 50 of the first tool type are distinguished in that they occur in virtually unchanged form in all of the images BNS of cutting edges 50 of the same first cutting edge type.

In a second characterization act ECMHS, characteristic features CMHS of cutting edges of the second cutting edge type are acquired via the evaluation device AUSW. The characteristic features CMHS are determined through software-based evaluation of the images BHS of the second cutting edge type that are kept in the memory of the evaluation device AUSW. In this case too, shape and color of the cutting edges of the second cutting edge type form characteristic features CHMS of the second cutting edge type. The characteristic features CMHS of the second cutting edge type occur in virtually identical form in all of the images BHS of the cutting edges of the second cutting edge type. The characteristic features CMHS of the second cutting edge type and the characteristic features CMNS of the first cutting edge type, however, differ significantly from one another. The respective characteristic features CMNS, CMHS are accordingly each characteristic and distinguishing for the first cutting edge type and the second cutting edge type.

Based on the characteristic features CMNS of the first cutting edge type and the characteristic features CMHS of the second cutting edge type, a transfer function TF is then derived via a software module ATF for deriving a transfer function. The transfer function transforms images BHS of the second cutting edge type into images BNS of the first cutting edge type. Using the transfer function, images BHS of cutting edges of the second cutting edge type may therefore be used to train the neural network NN of the evaluation unit AUSW to evaluate images BNS of the first cutting edge type.

The operation of the transfer function TF is illustrated in more detail in FIG. 3.

The images BHS of cutting edges of the second cutting edge type are transformed into images BNS of cutting edges 50 of the first cutting edge type via the transfer function TF.

The transfer function TF first transforms the color of the cutting edges of the second cutting edge type, such that the resultant images BNS are adapted in terms of color to the cutting edges 50 of the first cutting edge type.

The shape of the cutting edges of the second cutting edge type may also be transformed into a shape of the first cutting edge type by way of the transfer function TF. To this end, the images BHS of the second cutting edge type are split into small segments SEG that are appropriately shifted along directions R such that the modified images result in images BNS of the shape NF of the first cutting edge type. As an alternative or in addition, the image information may be compressed and/or stretched, such that the shape AF of the cutting edges of the second cutting edge type is transformed into the shape NF of the cutting edges 50 of the first cutting edge type. The color of the segments SEG is symbolized either by a colored dot or by a hatched dot in the drawing.

Via the transfer function TF determined in this way, all of the images of the cutting edges of the second cutting edge type may then be converted into images of the first cutting edge type by applying the transfer function TF, in a further method act AHB, to all of the images BHS of the cutting edges of the second tool type. A new dataset KADS of images BNS of cutting edges of the first cutting edge type is thereby generated. These newly generated images BNS of the dataset KADS are then assigned the categories MHS of the respective wear condition. The respective category MHS of the wear condition corresponds, in the illustrated exemplary embodiment, to the respective category of the wear condition of the cutting edges of the second cutting edge type. The categories are therefore transferred easily to the newly generated images BNS of the cutting edges 50 of the first cutting edge type and thereby easily assigned on an image-by-image basis. The respective category MHS of the wear condition is transmitted to the neural network by a data transmission TAM, such that the neural network NN receives both the categories MHS of the wear conditions and the respective newly generated images BNS of the cutting edges of the first cutting edge type.

The neural network is trained in a training act MT using this dataset KADS of new images BNS of cutting edges 50 of the first cutting edge type and the wear categories MHS respectively assigned to the images. After the neural network NN has been trained and thus constitutes a trained model TNM, this is stored and operatively used by the evaluation unit AUSW when machining the workpiece 30. By virtue of the trained neural network NN, a wear condition of the cutting edge 50 is able to be reliably determined in an estimation process PROG, and it is possible to ascertain a time to change the cutting edge 50. Depending on the wear condition of the cutting edge 50, machining parameters of the installation 10 for machining the workpiece 30 may additionally be adapted in an adaptation act SEGM in order to compensate for increasing wear of the cutting edge 50.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for training a neural network to recognize a machining tool condition based on image data, the method comprising:
    training the neural network to recognize the machining tool condition of a first tool type; and
    applying image data of a second tool type, the applied image data being subjected to image processing, via which the image data of the second tool type is converted into image data of the first tool type,
    wherein the neural network is trained based on the converted image data,
    wherein the image data of the second tool type is converted such that a shape of the second tool type is converted into a shape of the first tool type, and
    wherein the image data of the second tool type is assigned a respective machining tool condition that is applied in each case jointly with the image data of the second tool type to train the neural network.

2. The method of claim 1, wherein the image data of the second tool type is converted such that a color of the second tool type is converted into a color of the first tool type.

3. The method of claim 1, wherein the first tool type, the second tool type, or the first tool type and the second tool type are configured for subtractive machining of a workpiece.

4. The method of claim 3, wherein the first tool type, the second tool type, or the first tool type and the second tool type form a cutting tool, a milling tool, or a cutting and milling tool.

5. The method of claim 1, wherein the image data of the second tool type arises from optical imaging.

6. The method of claim 5, wherein the optical imaging comprises optical imaging using a camera.

7. The method of claim 6, wherein the optical imaging comprises optical imaging using a microscope camera.

8. The method of claim 1, wherein the machining tool condition is a wear condition.

9. The method of claim 1, wherein the image data of the second tool type is converted by modifying color channels, compressing, stretching image data, splitting image data and putting the image data back together differently, or any combination thereof.

10. The method of claim 9, wherein the image data of the second tool type is converted by splitting image data and putting the image data back together with a different position, orientation, compression, stretching, or any combination thereof.

11. A machining, production, or machining and production method that is performed via a first tool type, the machining, production, or machining and production method comprising:
    recognizing a machining tool condition of the first tool type by a neural network that is trained to recognize the machining tool condition of the first tool type, the training of the neural network comprising applying image data of a second tool type, the applied image data being subjected to image processing, via which the image data of the second tool type is converted into image data of the first tool type, the neural network being trained based on the converted image data,
    wherein the image data of the second tool type is converted such that a shape of the second tool type is converted into a shape of the first tool type, and
    wherein the image data of the second tool type is assigned a respective machining tool condition that is applied in each case jointly with the image data of the second tool type to train the neural network.

12. A system for machining, production, or machining and production via a first tool type, the system comprising:
    a processor configured to use a neural network that is trained to recognize a machining tool condition based on image data, the neural network being trained to recognize the machining tool condition of the first tool type, the training of the neural network further including application of image data of a second tool type, the applied image data being subjected to image processing, via which the image data of the second tool type is converted into image data of the first tool type,
    wherein the neural network is trained based on the converted image data,
    wherein the image data of the second tool type is converted such that a shape of the second tool type is converted into a shape of the first tool type, and
    wherein the image data of the second tool type is assigned a respective machining tool condition that is applied in each case jointly with the image data of the second tool type to train the neural network.

* * * * *